United States Patent [19]

Rabinow

[11] 3,776,557

[45] Dec. 4, 1973

[54] DYNAMICALLY-BALANCED PHONOGRAPH ARM

[76] Inventor: Jacob Rabinow, 6920 Selkirk Dr., Bethesda, Md. 20034

[22] Filed: May 13, 1971

[21] Appl. No.: 142,908

[52] U.S. Cl. ................ 274/23 R, 274/1 G, 274/9 R

[51] Int. Cl. ........................ G11b 3/14, G11b 25/04

[58] Field of Search ...................... 274/23 R, 1 A, 1, 274/1 G, 1 J, 7, 9 R, 9 B; 74/28, 61

[56] References Cited

UNITED STATES PATENTS 3,378,267 4/1968 Davis ............................... 274/23 R

FOREIGN PATENTS OR APPLICATIONS 501,608 1/1920 France ................................. 274/23

*Primary Examiner*—Louis R. Prince
*Assistant Examiner*—Steven L. Stephan
*Attorney*—Max L. Libman

[57] ABSTRACT

A conventional phonograph arm consists essentially of a balanced rod on one end of which is mounted a phono pick-up device (cartridge) and at the other end a counterweight. A pivot system located near the counterweight is so arranged that the cartridge can move vertically and laterally. Such arms suffer from the fact that when the turntable is suddenly tilted or vibrated the cartridge frequently leaves the surface of the record. The present disclosure describes the use of a two-element arm where the two elements are interconnected so as to rotate in opposite directions so that rotational motions of the machine do not cause the cartridge to leave the record.

16 Claims, 14 Drawing Figures

INVENTOR
Jacob Rabinow

BY Max L. Libman
ATTORNEY

FIG. 8.
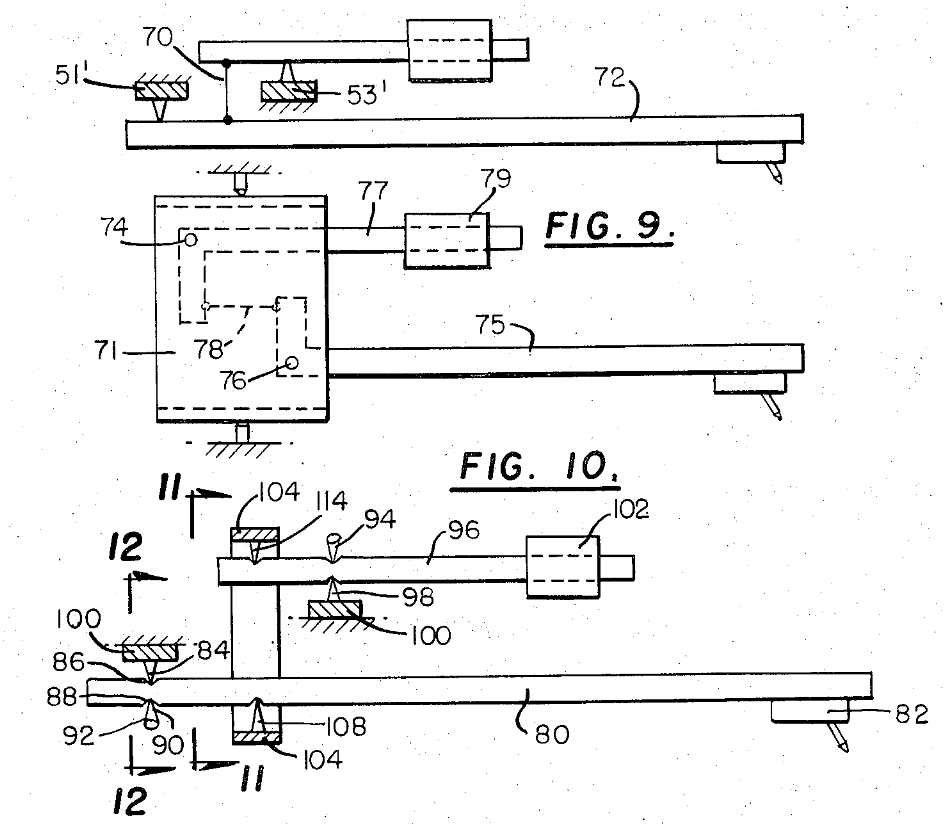
FIG. 9. FIG. 10.
FIG. 11.
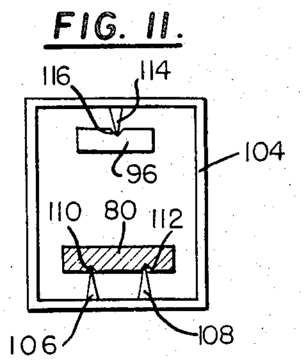
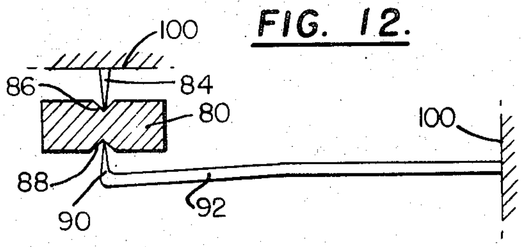
FIG. 12.
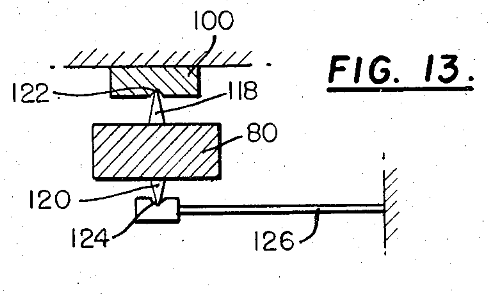
FIG. 13.
INVENTOR
Jacob Rabinow
BY Max L. Libman
ATTORNEY

DYNAMICALLY-BALANCED PHONOGRAPH ARM

The ordinary photograph arm in common use tody consists of a pivoted bar one end of which carries the cartridge while the other end carries a counterweight. To keep the moment of inertia of the arm at a low value, the counterweight is placed close to the pivot and the arm is either perfectly balanced about the pivot with a small spring applying a vertical force to the stylus, or the arm is nearly balanced with the slight unbalanced force providing the vertical force on the cartridge to keep the stylus in contact with the record disc.

Such simple arms suffer from the fact that if the frame of the machine is given a rotational velocity or acceleration the arm, because of its inertia, can easily lift the stylus off the record with obvious undesirable results. This difficulty is particularly true of modern cartridges that play with a vertical force of the order of one gram. This problem becomes particularly serious with the newer cartridges which play with a fraction of a gram and will continue to get worse as the vertical force is still further reduced. The problem is aggravated by the fact that modern phonographs are nearly always supported by spring mounts in order to minimize acoustic feedback and these mounts are easily excited by vibrations of the table or other supports on which the entire machine rests, which is often caused by people stamping heavily on the foor, as in dancing.

In order to overcome these difficulties, I have invented an arm which consists of two parts. The two parts are so coupled together that when one part rotates clockwise the other part rotates counter-clockwise. Any rotational acceleration on one which would tend to move this part relative to the frame would be cancelled out by the effects on the other part, and the two parts would move together as a unit with the frame. For convenience, and to reduce the total mass of the system, one part of the arm carries the cartridge and the second part carries the counterweight, although it should be understood that both parts could be individually balanced but still coupled so as to rotate in opposite directions.

It should be pointed out that the vertical component of rotation is the more serious in tonearms because it is this component that makes the cartridge "jump" out of the groove. The horizontal component is also serious but because of the shapes of the groove and stylus and because of the lesser horizontal freedom of the stylus, it is less troublesome.

The specific nature of my invention, as well as other objects and advantages thereof, will clearly appear from a description of a preferred embodiment as shown in the accompanying drawing in which:

FIG. 8 is a schematic side view showing the principle of a modified form of the invention using a flexible wire as the connecting link;

FIG. 9 is a sideview of a modification of the principle shown in FIG. 8;

FIG. 10 is a side view showing the principle of a tonearm balanced both vertically and horizontally;

FIG.11 is a view taken on line 11—11 of FIG. 10;

FIG. 12 is a sectional view taken on line 12—12 of FIG. 10;

FIG. 13 is a schematic view showing the principle of inversion of the bearing elements shown in FIG. 12.

Figures 1, 2, 3, 4, 5, 6, 7, 14:
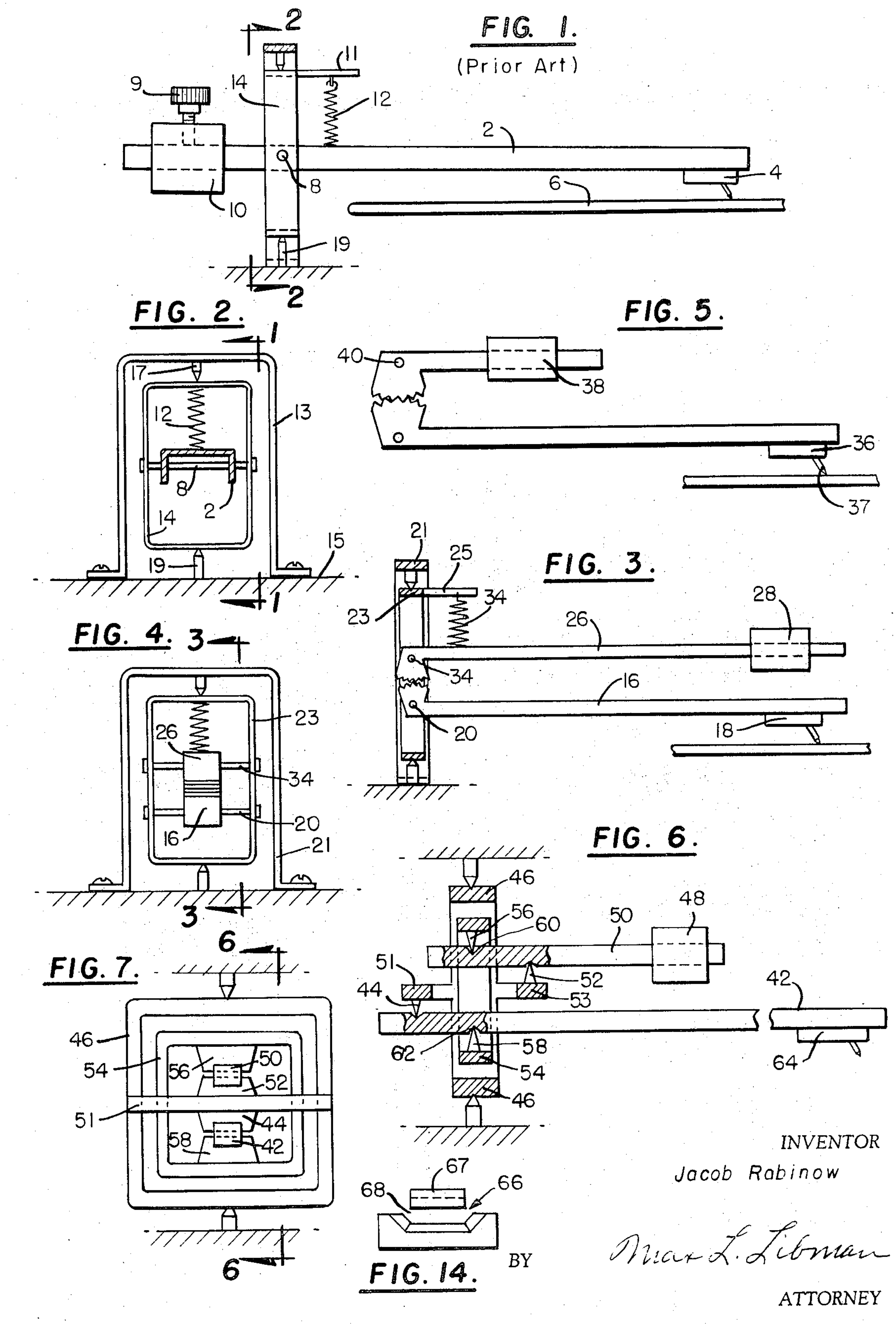
FIG. 1 is a side view of a conventional phonograph tonearm.
FIG. 2 is a view taken on line 2—2 of FIG. 1.
FIG. 3 is a side view showing the principle of a tonearm embodying the invention, taken on line 3—3 of FIG. 4.
FIG. 4 is a rearend view of the tonearm of FIG. 3.
FIG. 5 is a side view of a modified form of the invention shown in FIG. 3.
FIG. 6 is a side view of another form of the invention, using knife-edge pivot means, and taken on line 6—6 of FIG. 7.
FIG. 7 is a rearend view of the tonearm shown in FIG. 6.
FIG. 14 is a schematic view showing a detail of a knife-edge bearing.

FIG. 1 shows a conventional arm of the prior art with the stylus resting on the record 6. The arm usually consists of an inverted U-shaped rod 2 on which is mounted cartridge 4 resting on the record 6. The arm 2 is pivoted at 8 by means of a conventional bearing in a gimbal 14 shown in greater detail in FIG. 2; this gimbal is pivoted in a bracket 13 fastened to the base or frame 15 of the machine. The bracket 13 has two vertical pivots 17 and 19 which hold the gimbal 14 in position. The pivots 17 and 19 can be of the conical type or can use ballbearings or any other conventional type of bearing structure. Mounted inside the gimbal 14 is the arm 2. In FIG. 2 is shown a simple shaft 8 which supports the arm 2. The top of the gimbal 14 is extended at 11 so as to provide anchorage for the spring 12 if the spring is used. This construction of an arm pivoted in a gimbal is conventional and is used in the majority of today's phonographs. The arm itself can be a simple straight arm as shown in FIG. 1 or it can be offset or bent to improve the tangency between its cartridge and the record. This, again, is conventional and the offset construction of the arm is immaterial to the present invention.

A counterweight 10 is mounted on the arm as shown and can be moved along the arm to produce the desired vertical force on the cartridge 4. It can be locked in place by a set-screw 9 and can be located so as to completely balance the cartridge 4, in which case a light compression spring 12 is arranged between the gimbal 14 and the arm 2 to provide the vertical force on the cartridge 4.

It will be obvious that if the whole mechanism is given a sudden clockwise rotation in the plane of the drawing, a well-balanced arm would leave the record when the downward force on the cartridge become insufficient to produce the necessary clockwise acceleration of the arm. Similarly, if the frame of the machine were given a counter-clockwise jerk, the arm would be thrown off the record. These conditions are often encountered in actual practice.

FIG. 3 shows the basic elements of the present invention. Here the arm 16 carries a cartridge 18 and has its horizontal pivot at point 20. Gimbal 23 is almost identical with the gimbal 14 in FIG. 2 except that it has two bearings 34 and 20 to support the members 26 and 16 instead of the single arm of FIG. 1. The gimbal 23 may have the upper portion extended at 25 to provide an anchorage for spring 34 which in this case would be a tension spring. The reason for this is that if weight 28 just balances mass 18 of FIG. 3, the spring 34 provides a vertical lift on arm 26 and thus provides a downward force which is transmitted to cartridge 18. A compression spring between gimbal 23 and arm 16 would also accomplish the same result. Thus, the tension spring 34 can be used to provide the vertical force on the stylus similar in function to the spring 12 in FIG. 1.

It will be seen that with this device a sudden rotation of the frame of the machine would cause both the cartridge 18 and the weight 28 to move with the gimbal since the inertia force of one balances the inertia force of the other. It should be pointed out that these inertia forces are those due to the movement of the whole system, including the pivots 20 and 34. The effect of a warped record would be no different than it is for a conventional arm.

In FIG. 5 is shown the same design as in FIG. 3, except that to reduce the equivalent inertia of the cartridge 36, as seen by the stylus 37, the counterweight 38 is moved closer to the pivot 40 and made heavier. This means that the inertia of the whole system as affected by a warped record, for example, would be reduced as compared to that of the device in FIG. 3. The arrangement of FIG. 5 is analogous to the mechanism of FIG. 1 except for the fact that the two major mass components 36 and 38 move in opposite directions.

It should be recognized that for true inertial balance the counter-rotating masses should have equal moments of inertia. The fact that the upper arm statically balances the lower arm by using a larger mass and a shorter radius means that the moments of inertia will not be equal and perfect counter-rotating balance will not be obtained. Nevertheless the effect will be true to the extent that the two moments of inertia are equal so that most of the tendency of the stylus to leave the groove would be eliminated. The reason that I show a shorter arm with a heavier mass in most embodiments is that it is mechanically more convenient to build the devices in this fashion and, secondly, because the inertia of the counterweight, as reflected to the cartridge, is somewhat reduced by this expedient. In any particular design it is a matter of engineering judgement as to whether one should use perfectly equal counter-rotating inertias or use a shorter counterbalancing arm which produces a large portion of the effect desired.

Because the use of gears is undesirable and friction should be minimized, a more practical solution is shown in FIG. 6. Here, knife edges are used for bearings instead of pivots. The arrangement is functionally similar to that of FIG. 5 except that the arm 42 is pivoted on a knife edge 44 mounted on the gimbal 46. FIG. 7 shows a rear-end view of the gimbal 46 needed to support the arm assembly. Here the gimbal 46 is provided with two extensions located about its mid-point, and these extensions have horizontal members 51 and 53 to which are fastened knife edges 44 and 52. The gimbal 46 may also be mounted on a moving carriage such as is shown in U.S. Pat. No. 2,915,315, which describes a straight-line servo-driven phonograph arm.

Referring again to FIG. 6, a counterweight 48 is mounted on a short arm 50 pivoted on knife edge 52, and this knife edge is also mounted on the same gimbal 46 as knife edge 44. The two members 42 and 50 are connected by a yoke 54 which carries two knife edges 56 and 58. The upper edge 56 rests in a notch 60 in arm 50 and the lower knife edge 58 fits in the notch 62 in the arm 42. It will be seen that this arrangement is such that when the cartridge 64 moves up, the counterweight 48 moves down. This, of course, is the effect desired.

It will be obvious that a simple straight knife edge will not be constrained laterally in its seat and in order to prevent it from slipping sideways, a knife edge 66 can be shaped as shown in FIG. 14 so that notched member 67 is held firmly in saddle 68 and prevented from moving parallel to its edge. This technique of knife-edge pivoting is well understood in the various arts.

In FIG. 8 is shown an arrangement of the invention similar to that of FIG. 6 except that the yoke 54 and knife edges 56 and 58 are replaced by a short tension member 70 which may simply be a piece of flexible spring wire. The action of the arm 72 in FIG. 8 would otherwise be identical to that of the arm 42 in FIG. 6. Various configurations of such tension members can be arranged and FIG. 9 shows another arrangement using conventional pivots 74 and 76. These pivots can be of any type, such as, for example, of control or of ball bearing types. FIG. 9 also shows a side view of gimbal 71 which is a simple rectangular structure provided with two pivots 74 and 76 for arms 77 and 75 respectively.

It will be noted that the configurations of the Figures up to this point show embodiments of the invention designed to eliminate the inertia on the arm in the vertical plane only. The horizontal forces on the cartridge during shock excitation may also not be negligible, although less serve than in the vertical direction. FIG. 10 shows a cartridge supporting arrangement which is balanced in both the vertical and horizontal directions. The arm 80 which carries the cartridge 82 is pivoted for both vertical and horizontal motion of the cartridge by a conical pivot 84 sitting in a conical seat 86. The pivot 84 is rigidly mounted on the frame 100 of the phonograph or record player. This type of conical pivot eliminates the need for a gimbal because it permits the arm 80 and the cartridge 82 to move both vertically and horizontally. The arm 80 is prevented from rocking about the cone pivot 84 by the provision at its lower surface, immediately below the conical seat 86, of another conical seat 88 in which rests the pointed end 90 of a spring wire 92. This wire 92 extends at right angles to the arm 80, that is, perpendicular to the plane of the paper. FIG. 12, taken at right angles to FIG. 10, shows the spring wire 92 more clearly. It will be seen that the arm 80 can swing about the pivot 84 but cannot rock because of the restraint of the spring wire 92. The spring wire thus functions as a stabilizing element and two of them are used in the embodiment of FIG. 10, one labelled 92 and the other labelled 94. The action of the stabilizing wires 92 and 94 can be further explained as follows. The wire 92 is stiff in the dimension parallel to its length but the pivot end 90 of the wire can move up or down or sideways quite easily. By looking at FIG. 10, it can be seen that the vertical motion of the pivot 90 will be very small as the arm 80 pivots about the tip of pivot 84. However, when the cartridge 82 moves up or down due to a warped record, or for any reason, the wire 92 must flex and its spring rate provides a vertical component of force on cartridge 82. Any initial bias in this spring leads to no difficulty since this can be cancelled out in the initial adjustment of weight 102. In practice, the stylus is placed on the record and weigh 102 is adjusted until the stylus just bearly touches the record, then the weight 102 is moved toward pivot 114 by a fixed or predetermined amount so as to produce the desired vertical force on cartridge 82. Alternatively, if no weight calibration on arm 96 is provided, an external force-measuring device can be placed on the record to adjust the weight 102. Such force-measuring scales are commercially available and form no part of this invention.

The combination of a fixed pivot with a flexible pivot such as shown in FIGS. 10, 12, and 13, provides a torsionally rigid support for the arm while still permitting the cartridge to move up or down and left or right while at the same time eliminating the need for a gimbal assembly as used in a great many of today's arms.

Mounted in close proximity to arm 80 is a second counterweight arm 96 which rests on a conical pivot 98 likewise mounted on the frame 100 of the machine. Stabilizing wire 94, similar to the one shown at 92 in FIGS. 10 and 12, is mounted so as to keep the arm 96 from rocking and the counterweight 102 is therefore free to move up and down and/or left and righ in the same manner as the cartridge 82.

A yoke 104 couples the two members 80 and 96 together in a manner which can be more clearly seen in FIG. 11. The bottom of the yoke 104 is provided with two conical pivots 106 and 108 resting in two conical seats 110 and 112 in the arm 80. The upper portion of the yoke 104 has a single conical pivot 114 sitting in the seat 116 of the counterweight arm 96. The arrangement, as far as the vertical motion is concerned, is exactly analogous to the arrangement as seen in FIG. 6. However, because conical pivots are now used instead of knife edges, the arms 80 and 96 are also coupled in the horizontal mode. For example, if the cartridge 82 moves out of the paper toward the observer, the yoke 104 will move out of the paper toward the observer also. The pivot 114 will drive the left end of the counterweight arm 96 toward the observer and the weight 102 will move away from the observer into the plane of the paper.

It will be seen, therefore, that the cartridge 82 and the counterweight 102 are so arranged that when the cartridge 82 moves up the weight 102 moves down, and when the artridge 82 moves left, the weight 102 moves right. Thus the inertias of the two neutralize each other as far as the motion of the whole machine is concerned.

The whole assembly of the two arms of FIG. 10 can be made to be supported by a servo mechanism carriage such as is shown in U.S. Pats. Nos. 2,915,315 and 3,572,724.

The pivots which support the arms 80 and 96 can be inverted, that is, instead of the pivots 84 and 90 being mounted on the frame 100, the conical pivots 118 and 120 can be mounted on the arm 80 as shown in FIG. 13, and the conical seat 122 is made part of the frame 100, while the seat 124 is attached to the stabilizing wire 126. It should be understood that either type of pivots (FIG. 12 or FIG. 13) is suitable except that the distance between the pivot points can be increased by the arrangement of FIG. 13, giving more torsional stability to the arms 80 and 96. I can also use a combination of pivots so that the bottom pivot could be a male arrangement such as in FIG. 13 while the top pivot can be a female arrangement such as shown in FIG. 12, or the reverse.

While conventional bearings, conical pivots and knife edges are shown in the embodiments of the various Figures, it would also be possible to use cross-wire or cross-spring suspensions of the type described in my U.S. Pat. No. 3,572,724. The advantage of this type of support can thus be combined with the advantages of the present invention.

While the two basic components of the present invention are shown as being mounted one above the other, it is obvious that many other arrangements are possible. For example, the counterbalance arm can be mounted at the side of the main arm, can be made to straddle it, or one arm can be placed inside the other. The counter-rotating masses do not need to be made in the shape of rods. The cartridge supporting member may be a balanced rod, while the counter-rotating element may be a disc, or of any other desired suitable shape.

I claim:

1. a. Pivot bearing for a cartridge supporting arm for a phonograph record player, comprising
   b. a single point pivot bearing between the frame of the record player and the arm,
   c. said bearing comprising a pointed element fitting into a conical dimple element, one of said elements being fixed to said frame and the other of said elements being on a surface of said arm,
   d. and a supplementary single point pivot bearing located at the opposite surface of the arm from its bearing element, such that the line connecting the two pivot bearings is substantially at right angles to the longitudinal axis of the arm,
   e. said supplementary bearing being mounted on a flexible spring supported member which has a limited spring compliance in the direction of said longitudinal axis but is rigid in the direction perpendicular to the arm and parallel to the plane of a record being played, so that it can move in a direction parallel to the axis of the arm, but not in a direction which is at right angles to the arm and parallel to the plane of the record, so as to restrain the arm from rocking on the first single point pivot bearing, about an axis parallel to the longitudinal axis of the arm.

2. a. A phonograph record player comprising a frame supporting a disc record for rotation in the horizontal plane,
   b. a pick-up cartridge for playing such a disc record,
   c. supporting means mounted on said frame for supporting said cartridge,
   d. said cartridge-supporting means comprising two rotatably supported members, one of said members being arranged to hold said cartridge,
   e. the second of said members arranged to support a supplementary cartridge-balancing mass,
   f. and means to couple the said two members for counter-rotation so that when one of said members rotates in one direction, the other of said members rotates in the opposite direction.

3. The invention according to claim 2,
   g. said members being so balanced that a horizontal or vertical rotary or displacement force applied to the members through the frame produces no net rotation of the members relative to the frame.

4. The invention according to claim 2,
   g. one of said members being an arm carrying the cartridge at one end and being pivoted near its opposite end,
   h. the second member being an arm with one end carrying a balancing mass and being pivoted near the other end.

5. The invention according to claim 4, g. wherein the coupling means comprises two meshing gears, one being mounted on one member and the other being mounted on the other member.

6. The invention according to claim 4, g. said coupling means being a mechanical link arranged to transmit pivotal motion from one of said members to the other in the opposite sense.

7. The invention according to claim 6, h. said link comprising a flexible wire.

8. The invention according to claim 2, g. wherein the coupling means is so arranged that when the cartridge tends to move up, the supplementary mass tends to move down and vice versa.

9. The invention according to claim 2, g. wherein the coupling means is so arranged that when the first member rotates clockwise relative to the frame, the second member rotates counterclockwise relative to the frame, this relative action occuring in both the vertical and horizontal planes relative to the frame.

10. a. A phonograph disc record player comprising a frame, b. a first arm element having a phonograph cartridge at one end, said arm being pivotally mounted on a bearing on the said frame at the other end for limited pivotal motion of the arm in the direction perpendicular to the plane of a record being played, c. a counter-mass element on a second arm displaced from the first arm in a direction perpendicular to the plane of the record, said second arm being similarly pivoted on a bearing on the frame at a point displaced from the first arm in a direction perpendicular to the plane of the record and intermediate its ends, d. coupling means connecting said two arms adjacent to the said two bearings and arranged so that when the first arm tends to pivot on its bearing in one direction the counterweight arm tends to pivot about its bearing in the opposite direction.

11. The invention according to claim 10, e. said two bearings each having freedom of rotation in directions both perpendicular and parallel to the record being played, whereby the tone arm is counter-balanced against rotational acceleration forces transmitted through the frame in both said directions.

12. The invention according to claim 11, f. at least one of said bearing comprising a pointed male element fitting loosely into a conical depression.

13. a. A phonograph record player comprising a frame supporting a disc record for rotation in the horizontal plane:

b. a first arm element having a phonograph cartridge near one end and a first pivotal bearing near the other end, said pivotal bearing having two relatively movable elements, supporting the arm for pivota movement, c. one of said elements being mounted on said frame and the other on said arm, d. a counter-mass arm element having a second pivotal bearing near one end thereof, the other end being free, with the center of gravity of said mass lying over said first arm and the bearing of the counter-mass arm being displaced from said first pivotal bearing along a line parallel the line of said first arm;

e. coupling means connecting said two arms intermediate of said two bearings, and arranged so that when said first arm tends to pivot on its bearing in one direction, the counter-weight arm tends to pivot about its bearing in the opposite direction.

14. The invention according to claim 13, f. at least one of said pivotal bearings being a knife-edge bearing.

15. The invention according to claim 13, f. said pivotal bearings being knife-edge bearings, g. a sub-frame supporting said bearings, h. and a gimbal supporting said sub-frame, i. said gimbal being mounted on the phonograph player for rotation about a vertical axis.

16. a. A cartridge support structure for a phonograph record player which includes b. a first means to support a cartridge for pivotal movement about an axis and c. a second means to pivotally support a counterweight for said cartridge, d. and means to couple said first and second supporting means so that when the cartridge moves pivotally about said axis in one direction, the counterweight counter rotates pivotally in the opposite direction.

* * * * *